United States Patent Office 2,841,569
Patented July 1, 1958

2,841,569

GRAFT POLYMERS OF POLYETHYLENE AND POLYMERIZABLE NITRILES AND PROCESS FOR PRODUCING SAME

Frank M. Rugg, West Caldwell, and James E. Potts, Roseland, N. J., assignors to Union Carbide Corporation, a corporation of New York No Drawing. Application August 30, 1954
Serial No. 453,128

12 Claims. (Cl. 260—45.5)

This invention relates to thermoplastic reaction products of polyethylene and a polymerizable nitrile monomer, particularly acrylonitrile.

Polyethylene is a wax-like, essentially linear chain, polymer obtainable by polymerization of ethylene under very high pressures in the presence or absence of oxygen. Average molecular weights of polyethylene, depending on the polymerizing conditions, range from about 500 to 40,000, and even higher when desired. Polyethylenes have many desirable properties including toughness, flexibility, chemical inertness, and solvent resistance. However, for certain applications polyethylene is found lacking in modulus of elasticity, or stiffness, heat distortion and film clarity.

It has been proposed to prepare interpolymers of ethylene and such polymerizable vinyl compounds as vinyl acetate, vinyl chloride, and acrylonitrile. These interpolymers are characterized as being composed of single chain polymers on which the ethylene groups (E) are interposed with linearly recurring groups (V) of the vinyl compounds as follows:

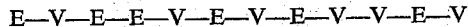

The properties of these interpolymers depend on the nature and concentration of the particular vinyl compound interpolymerized with ethylene and, generally, do not exhibit the desirable combination of toughness, flexibility, chemical inertness and solvent resistance displayed by polyethylene.

It has also been proposed to form ethylene-modified polymers by reacting pre-existing polymers such as polyvinyl esters, polyamides, cellulose and others with ethylene under pressures of from 50 to 1500 atmospheres in the presence of a catalyst. These ethylene-modified polymers are alleged to contain substituent ethylene groups (E), or polyethylene chains, attached to the pre-existing polymer chain (M—M—M—M—) in the following manner:

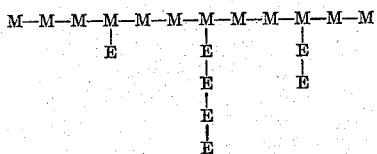

Furthermore, these polymers display properties which are largely associated with those of the pre-existing polymeric chain.

Although some improvements in resistance to heat distortion and stiffness can be imparted to polyethylene by physically blending therewith small amounts of a nitrile polymer such as polyacrylonitrile, there are attendant disadvantages since polyacrylonitrile is insufficiently compatible with polyethylene to form a homogeneous mixture which when molded into sheet form is transparent, can be creased or folded without blushing at the creased area, and which has good tear resistance. Moreover, such blends when molded under heat and pressure, yield articles having lower tensile strength than polyethylene. In addition, fibers made from such mixtures cannot be cold-drawn to improve tensile strength as is normally the case with fibers made from unmodified polyethylene.

In all of the aforementioned proposals and expedients for forming modified polymers or polymeric mixtures, there has neither been contemplated nor provided a modified polymer of ethylene wherein the essentially linear chains of ethylene groups characterizing polyethylene is preserved substantially intact, and modified only by random attachment as side chains to said linear chains of groups other than ethylene, whereby the resultant modified polymer retains much of the original and normal properties of polyethylene but nevertheless due to the presence of the chemically combined groups exhibits properties unobtainable from mere mixtures of polyethylene and other polymers, or from polymerizing ethylene in the presence of other polymers, or by copolymerizing ethylene with other monomers.

It is an object of this invention to prepare polyethylene compositions which are tough, flexible, chemically inert and solvent resistant and which are also higher in modulus of elasticity and heat distortion temperatures than unmodified polyethylene.

Another object is the preparation of homogeneous polyethylene compositions which can be formed into clear films or sheetings that do not blush when creased or folded and which have good tear resistance.

A further object is the preparation of polyethylene compositions which are compatible with polyacrylonitrile.

The accomplishment of the aforementioned objects and others hereinafter brought out, will become apparent as the description of the invention proceeds.

We have found that by polymerizing, in the presence of a free radical initiator of polymerization, a homopolymerizable nitrile monomer, and particularly those nitriles having the formula

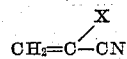

wherein X is hydrogen, a halogen, a cyano or a methyl group, while in a solution of polyethylene, that a significant proportion of the nitrile monomer becomes chemically combined, as polymeric side chains, on the linear polyethylene chains thus forming what is herein termed as a graft copolymer of polyethylene and the nitrile, while the remaining proportion of polymerized nitrile monomer exists as homopolymer.

While the mechanism of the graft polymerization reaction has not been fully determined, it is believed that it can be graphically illustrated as follows, where E represents an ethylene segment

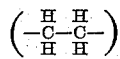

in a polyethylene chain and V represents a nitrile segment

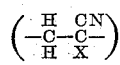

of a polynitrile chain:

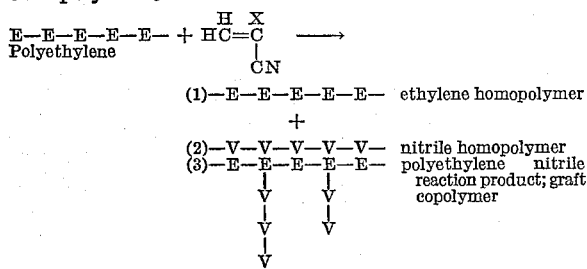

The final gross reaction product is ordinarily a clear, homogeneous, thermoplastic, mixture which can be shown by suitable solvent extractions to contain a graft copolymer of copolyethylene and the nitrile, some nitrile homopolymer, and some ethylene homopolymer which has not reacted with the nitrile monomer. In the case of products obtained from acrylonitrile and polyethylene, the polyethylene homopolymer can be separated from the mixed reaction product by extraction (Soxhlet technique) with hot (75° C.) benzene, since the acrylonitrile homopolymer and the graft copolymer of polyethylene and acrylonitrile are benzene insoluble. Then the acrylonitrile homopolymer can be extracted (Soxhlet technique) by means of hot (95° C.) dimethyl formamide from the graft copolymer of polyethylene and acrylonitrile which is insoluble in dimethyl formamide.

The graft copolymers, isolated in the above manner are thermoplastic and can be molded or pressed at temperatures of about 115° C.–135° C. and pressures of 10,000 to 25,000 p. s. i., into thin (2–4 mils) films which are transparent, yellow to brown in color and exceptionally tough and stiff. The Rossi-Peakes flow data given in Table I show how stiff, or viscous, these graft copolymers are at elevated temperatures compared to unmodified polyethylene and to a physical blend of polyacrylonitrile and polyethylene.

TABLE I

*Rossi-Peakes flow data*

[Time to flow 0.4 inch at 135° C. and 1000 p.s.i.]

| Type of product [1] | Percent acrylonitrile | Time in seconds |
| --- | --- | --- |
| 1. Unmodified polyethylene | 0 | 13 |
| 2. Physical blend | 30 (as homopolymer) | 18 |
| 3. Graft copolymer | 30 (as grafted polyacrylonitrile chains). | 180 |

[1] Same polyethylene used in all cases, M.W.=21,000.

For many uses the gross reaction product need not be separated into its individual components, since the mixture as such or with the addition of molding material fillers such as clays, wood flour, glass fibers and the like, or pigment or dyes and stabilizers can be molded into useful articles by compression or injection molding equipment. Furthermore, since the graft copolymer of polyethylene and nitrile in the mixed reaction product is highly compatible with nitrile homopolymers as well as polyethylene homopolymers, it is possible to homogeneously incorporate in the reaction products either more polyethylene homopolymer or more nitrile homopolymer, and thus emphasize or modify physical properties as desired.

The properties of the gross reaction product will vary depending upon the amounts of grafted copolymer and upon the amounts of ethylene homopolymer and nitrile homopolymer. As the grafted copolymer content increases, the product becomes more transparent than the original polyethylene.

Furthermore, as the grafted copolymer content increases, the gross reaction product will tolerate more nitrile homopolymer as indicated by the fact that they can be creased without blushing and cold drawn, thus differing from a physical blend of a polynitrile and polyethylene. Both Rockwell hardness and modulus of elasticity increase with increased polynitrile content.

The preparation of the nitrile grafted polyethylene is usually carried out in solution, that is the polyethylene along with a free radical type catalyst is dissolved in a hot solvent such as benzene, heptane, carbon tetrachloride, or cyclohexane and the nitrile monomer is introduced into the solution. The solution is heated at polymerization temperatures, from about 60° C. to 150° C. for several hours in the substantial absence of air or oxygen, then solvent and unreacted nitrile monomer are removed and the residue remaining is a mixture of unreacted polyethylene, nitrile homopolymer and the graft copolymer of polyethylene and the nitrile monomer.

Suitable free radical catalytic initiators of the reaction between the polyethylene and the polymerizable nitrile monomer are the peroxide catalysts such as benzoyl peroxide, cyclohexyl hydroperoxide, acetyl peroxide, lauryl peroxide and ditertiary butyl peroxide. Initiators of somewhat higher polymerizing efficiency are the azo catalysts such as $\alpha,\alpha'$-azobisisobutyronitrile. Furthermore, reaction products prepared with the azo type catalysts have less color than those prepared with peroxide catalysts.

As polymerizable nitrile monomers that can be reacted with polyethylene homopolymer to form graft copolymers and which are contemplated by the aforedescribed structure

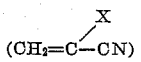

reference is had to acrylonitrile, methacrylonitrile, alpha-bromoacrylonitrile, alpha-chloroacrylonitrile and vinylidene cyanide.

The examples hereinafter described further illustrate the invention, it being understood that all parts and percentages are by weight.

EXAMPLE 1

(A) A mixture of 450 grams of benzene, 100.0 grams of a brittle polyethylene (12,000 M. W.) and 0.30 gram of benzoyl peroxide was refluxed at 80° C. with agitation until a clear solution was obtained (30 minutes); 102 grams of distilled acrylonitrile were added dropwise to the refluxing solution. The temperature was dropped to 76° C. The solution became cloudy, within 25 minutes, after about half the monomer had been added, this being indicative that benzene insoluble polymers were being formed. The remainder of the acrylonitrile was added during the next fifteen minutes while the refluxing reaction mass appeared to become more highly viscous. During a subsequent four hours of reflux the reaction temperature rose to 79° C. The fluid reaction mass was poured into a glass tray and the benzene and unreacted acrylonitrile were volatilized at room temperature yielding 100 grams of a dry, white, stiff solid; approximately 30 grams of dark yellow resin remained in the flask. The dry, white solid contained 26% polymerized acrylonitrile, and 74% polyethylene by infrared analysis. Soxhlet extraction with hot benzene (35 hours) removed only 85% of the polyethylene from this product, but all (100%) of the polyethylene from a comparable physical blend of 80 parts of polyethylene and 20 parts of polyacrylonitrile, indicating that 15% of the polyethylene had combined with acrylonitrile.

(B) A mixture of 250 grams of benzene and 75 grams of a brittle polyethylene (12,000 M. W.) was refluxed with vigorous agitation to give a clear solution. To the refluxing solution a clear solution of 75.6 grams of distilled acrylonitrile, 51 grams of benzene and 0.20 gram of benzoyl peroxide were added dropwise. Within 18 minutes the mass became cloudy after only about half of the acrylonitrile having been added. Monomer addition was completed during the subsequent thirty minutes and fifty-eight grams of benzene were then added to reduce the viscosity of the reaction mass. The mass was allowed to reflux for an additional thirty minutes and was, then, poured into a tray yielding 89.4 grams of a white, horny resin after essentially all of the benzene and unreacted acrylonitrile had been volatilized at 60° C.–70° C. The product contained 14% polymerized acrylonitrile, and 86% polyethylene by infra-red analysis. Only 89% of the polyethylene present in this gross reaction product could be extracted with hot benzene indicating that 11% of the polyethylene had combined with acrylonitrile.

EXAMPLE 2

Three hundred grams of a soft polyethylene (M. W.=3,000) were dissolved with agitation in 2400 grams of benzene at 80° C. To this refluxing benzene solution 159.2 grams of acrylonitrile were added dropwise. 0.36 gram of benzoyl peroxide was added in 90 grams of benzene, and polymerization was carried out in an inert atmosphere by passing nitrogen gas through the system. Reaction was continued for 12 hours, at 75° C.–79° C. The reaction mass was, then, poured into hot methanol and the resultant precipitate was air dried. The dried precipitate was a greyish-white resin, somewhat stiffer than the original polyethylene, and it contained 7.6% polymerized acrylonitrile and 92.4% polyethylene by chemical analysis of nitrogen content (Kjeldahl). Extraction with hot benzene showed that 4% of the polyethylene was combined with acrylonitrile.

EXAMPLE 3

(A) In order to prepare an intimate physical blend of polyacrylonitrile and polyethylene for purposes of comparison, 48.1 grams of powdered polyacrylonitrile (M. W.=15,000) was dispersed with vigorous stirring in 2600 grams of hot benzene. To this dispersion, 272 grams of polyethylene (M. W.=21,000) were gradually added. Stirring and heating were continued until all of the polyethylene was dissolved, at which time the mass was poured into ceramic coated trays to allow the benzene to volatilize. Residual benzene was removed by milling on hot rolls at 115° C.

The resulting blend contained 15% polyacrylonitrile and 85% polyethylene. That intimate mixing was achieved was indicated by the uniform translucency of 15 mil thick films produced from this blend by pressing at 15,000 p. s. i. and 110° C. Soxhlet extraction of this blend revealed that 85% was extracted with benzene and, subsequently, the remaining 15% was extracted with dimethyl formamide.

(B) 2400 grams benzene were introduced into a five-liter, three-necked flask, fitted with a stirrer, condenser and thermometer. The benzene was brought to its boiling point (80° C.) and 300 grams of a tough polyethylene (M. W.=21,000) were slowly added over a half hour period. The mixture was stirred to complete solution and then 159.2 grams acrylonitrile monomer were dropped in over a 15 minute period. The resulting solution was clear. Subsequently, 0.36 gram benzoyl peroxide catalyst was added. One hundred cc. of benzene were used to wash all monomer and catalyst solution into the flask, and nitrogen gas was then bubbled through the liquid which became hazy after approximately 2–5 minutes, indicating that a reaction was taking place. The reaction was continued for 2.8 hours at a temperature of 76° C. The reaction mass was then poured out onto two trays. The benzene solvent and the unreacted acrylonitrile monomer were removed by air drying overnight under a hood, then by drying at reduced pressure in a vacuum oven (60° C.) for 24 hours and, finally, by milling on rolls at 115° C.–125° C. until completely dry. The product was a tough resin which contained 4.96% polymerized acrylonitrile, as homopolymer and in the form of graft copolymer, as determined by nitrogen analysis and solvent extraction procedures.

(C) A reaction similar to that in (B), but with a reaction time of 7.8 hours, yielded a product containing 9.56% polymerized acrylonitrile, as homopolymer and in the form of graft copolymer.

(D) A reaction the same as (B) but for a reaction time of 17.3 hours, yielded a product having a polymerized acrylonitrile content, as homopolymer and in the form of graft copolymer, of 10.3%.

(E) A mixture of 300 grams of polyethylene (M. W.=21,000) dissolved in 2580 grams of benzene and 159.2 grams acrylonitrile was reacted in a manner similar to that described in (B), except that 0.36 gram of catalyst (benzoyl peroxide) was added at the start of the reaction, then a second addition of 0.36 gram made at the end of three hours reaction and a third addition of 0.36 gram made at the end of six hours, and the total reaction time was 9 hours. The dried reaction product contained 15.0% polymerized acrylonitrile, as homopolymer and as graft copolymer, which corresponded to a 33.2% conversion of the monomer, i. e. weight of polymerized acrylonitrile formed divided by weight of monomer charged.

(F) A reaction was conducted similar to that described in (B) but using 2490 grams of benzene, 225 grams of polyethylene, 212.2 grams of acrylonitrile and 1.92 grams of catalyst. The catalyst addition was made in portions, 0.96 gram at start and a second addition of 0.96 gram after four hours. Total reaction time was 6.5 hours. The volatile-free reaction product contained 28.7% polymerized acrylonitrile, as homopolymer and as graft copolymer, which corresponds to 42.8% conversion of the monomer.

(G) A mixture of 100 grams of polyethylene (M. W.=21,000) dissolved in 1450 grams of benzene, and 106.6 grams acrylonitrile was reacted in a manner similar to that described in (B) using 0.45 gram catalyst (benzoyl peroxide) added at the start of the reaction and 0.25 gram of catalyst after three hours of reaction. The total reaction time was 5¼ hours. The dried reaction product contained 26.6% polymerized acrylonitrile, as homopolymer and as graft copolymer.

(H) A mixture of 1280 grams of benzene, 50 grams of polyethylene (M. W.=21,000) and 159.3 grams of acrylonitrile was reacted in a manner similar to that described in (B) using 0.73 gram benzoyl peroxide catalyst added at the start of the reaction. The reaction time was 3¾ hours. The dried reaction product contained 54.0% polymerized acrylonitrile as homopolymer and as graft copolymer.

Table II summarizes the compositions and the physical properties of the products in Example 3 in comparison to a polyethylene of the M. W. 21,000.

The percent ethylene and acrylonitrile homopolymer, and the percent of graft copolymer in the reaction products prepared in Example 3 were determined as follows:

10.0 gms. of the resinous reaction product in a weighed Soxhlet thimble were subjected to hot (75° C.) benzene extraction until constant weight of the thimble plus contents had been reached (100–300 hrs.). Infrared analysis of the solids dissolved in the benzene indicated that it was pure polyethylene. The loss of weight of the thimble, plus contents, gave the amount of ethylene homopolymer in the unextracted resin. The benzene extracted resin was then extracted in Soxhlet apparatus under reduced pressure with hot (95° C.) dimethyl formamide until constant weight had been reached (24–48 hours). The infrared spectrum of the solid dissolved by the dimethyl formamide showed it to be pure polymerized acrylonitrile. The difference of the weight of the thimble before and after the second extraction gave the quantity of polymerized acrylonitrile homopolymer present in the resin. The residual, insoluble material is the graft copolymer. The difference of the weight of the thimble after the two extractions and the empty thimble gives the amount of graft co-polymer in the resin.

TABLE II

| Example | Total percent PAC | Percent ethylene homopolymer [1] | Percent acrylonitrile homopolymer [2] | Percent graft copolymer | Percent polyacrylonitrile in graft [3] copolymer | 15 ml. films pressed 15,000 p. s. i. 110° C. | | | Injection molded bars at 10,000 p. s. i., cyl. temp. 270-310° F. | | | | |
|---|---|---|---|---|---|---|---|---|---|---|---|---|---|
| | | | | | | Appearance | Tear and crease resistance | Cold drawing capability | Tensile, p. s. i. | Mod. elas., p. s. i. | Percent elong. | Heat distortion, °C., ASTM 66 p.s.i. | Rockwell hardness, R scale |
| 3 (A) (physical blend). | 15.0 | 85.0 | 15.0 | 0 | 0 | Faint yellow, translucent.. | Tears easily and blushes. | None, ruptures readily. | 1,770 | 31,000 | 41 | 52 | −16 |
| 3 (B) | 5.0 | 84.6 | 1.9 | 13.5 | 24 | Faint yellow, hazy to transparent. | Good | Good | 1,990 | 21,000 | 51 | 43 | −18 |
| 3 (C) | 9.6 | 82.0 | 4.5 | 13.5 | 38 | Light yellow, transparent. | ___do___ | ___do___ | 1,890 | 28,000 | 50 | 49 | −14 |
| 3 (E) | 15.0 | 66.5 | 6.6 | 26.9 | 30 | Highly transparent, yellow. | ___do___ | ___do___ | 2,010 | 29,000 | 56 | 49 | −14 |
| 3 (F) | 28.7 | 47.8 | 18.5 | 33.7 | 30 | ___do___ | ___do___ | Fair | 2,050 | 46,000 | 46 | 52 | −6 |
| 3 (G) | 26.6 | 60.6 | 18.5 | 21.9 | 32 | ___do___ | ___do___ | ___do___ | | | | | |
| 3 (H) | 54.0 | 34.0 | 42.3 | 23.7 | 45 | Highly transparent, yellow to brown. | ___do___ | ___do___ | | | | | |
| Polyethylene, M.W. 21,000. | 0 | 100.0 | | | | Colorless, hazy | ___do___ | Best | 1,910 | 20,000 | 43 | 42 | −18 |

PAC—Polymerized acrylonitrile as homopolymer and as graft copolymer.
[1] Extracted with hot benzene (75° C.).
[2] Extracted with hot dimethyl formamide (95° C.).
[3] By infrared analyses of the isolated graft copolymer.

EXAMPLE 4

(A) Three hundred grams polyethylene (M. W.= 21,000) dissolved in 2400 grams benzene, were reacted with 159.2 grams acrylonitrile in the general manner described in Example 3, but using 0.244 gram alpha,alpha'-azobis isobutyronitrile as catalyst. The reaction time was 17.3 hours. The reaction product after removal of benzene and unreacted acrylonitrile contained 15.8% polymerized acrylonitrile as homopolymer and as combined with polyethylene as graft copolymer, which corresponds to 32.2% conversion of the monomer.

Consecutive solvent extractions of this product with benzene and dimethyl formamide showed that it contained 31.1% acrylonitrile homopolymer, 44.6% ethylene homopolymer and 24.3% graft copolymer by weight. The graft copolymer was found to contain 29 parts of polymerized acrylonitrile bound to 71 parts of polyethylene.

In Table III there is tabulated the data from the previous examples which illustrate the higher percent conversion of acrylonitrile monomer obtained from the use of azo catalysts as compared with benzoyl peroxide catalyst.

TABLE III

*Efficiency of azo catalyst as compared to benzoyl peroxide catalyst*

| Example | Catalyst type | Total catalyst used | Amount catalyst at start, g. | Amount after 3 Hrs., g. | Percent conv. of monomer | Total percent PAC in product |
|---|---|---|---|---|---|---|
| 3 (D) | Peroxy | 0.36 g. (.0005 mole) | 0.36 | | 21.5 | 10.3 |
| 4 (A) | Azo | 0.244 g. (.0005 mole) | 0.244 | | 32.2 | 15.8 |
| 3 (F) | Peroxy | 1.92 g. (.0020 mole) | 0.96 | 0.96 | 42.8 | 28.7 |
| 4 (B) | Azo | 1.30 g. (.0020 mole) | 0.65 | 0.65 | 65.5 | 38.2 |

(A) Two hundred twenty-five grams (16 moles) polyethylene (M. W.=21,000) dissolved in 3200 grams (32 moles) of refluxing heptane were reacted with 212.2 grams (4 moles) acrylonitrile in a manner similar to that described for Example 3 (B) using 1.92 grams benzoyl peroxide catalyst, one half of which was added at the start of reaction and the remainder at the end of three hours reaction time. Total reaction time (at 78° C.–83° C.) was six hours. The volatile-free reaction product contained 38.6% polymerized acrylonitrile as homopolymer and as combined with polyethylene in graft copolymer, which corresponds to 67% conversion of the acrylonitrile.

Consecutive solvent extraction showed that this product contained 32.4% acrylonitrile homopolymer, 50.0% ethylene homopolymer and 17.6% graft copolymer by weight. The graft copolymer contained 35 parts of polymerized acrylonitrile bound to 65 parts of polyethylene.

(B) Two hundred twenty-five grams (16 moles) polyethylene (M. W.=21,000) dissolved in 2688 grams (32 moles) of refluxing cyclohexane were reacted with 212.2 grams (4 moles) acrylonitrile using 1.92 grams benzoyl peroxide catalyst as in Example 5 (A). Total reaction time (at 66° C.–73° C.) was six hours. The volatile-free reaction product contained 41.1% polymerized acrylonitrile as homopolymer and as combined with polyethylene in graft copolymer, which corresponds to 70% conversion of the monomer.

Solvent extraction of this product showed that it contained 44.0% ethylene homopolymer, 34.5% acrylonitrile homopolymer and 21.5% graft copolymer. The graft copolymer contained 31 parts of polymerized acrylonitrile bound to 69 parts of polyethylene.

(C) Two hundred twenty-five grams (16 moles) polyethylene (M. W.=21,000) dissolved in 4928 grams (32 moles) of refluxing carbon tetrachloride were reacted with 212.2 grams acrylonitrile using 1.92 grams benzoyl peroxide as catalyst as described in Example 5 (A). Total reaction time (at 68° C.–78° C.) was six hours. The dried reaction product contained 37.0% polymerized acrylonitrile as homoploymer and as combined with polyethylene in graft copolymer, which corresponds to 62% conversion of the monomeric acrylonitrile. Only 87% of the polyethylene in this product could be removed by exhaustive Soxhlet extraction with hot benzene, indicating that 13% of the polyethylene was chemically combined with acrylonitrile.

The effect of different solvents on percent conversion of acrylonitrile monomer is shown below in Table IV, benzene having the lowest efficiency and cyclohexane the most.

TABLE IV

| Example | Solvent | Total percent PAC in product | Percent conversion of monomer |
|---|---|---|---|
| 3 (F) | Benzene | 28.7 | 43 |
| 5 (A) | n-Heptane | 38.6 | 67 |
| 5 (B) | Cyclohexane | 41.1 | 70 |
| 5 (C) | Carbon tet | 37.0 | 62 |

EXAMPLE 6

A hot solution of 1000 grams of cyclohexane, 100 grams of polyethylene (M. W.=21,000) and 100 grams of acrylonitrile was added to an 18–8 stainless steel reactor provided with stirring facilities. After the addition of 1.2 grams of ditertiary butyl peroxide (added in solution with 100 ml. of cyclohexane), the reactor was placed under 230 p. s. i. pressure with nitrogen gas. Reaction was allowed to proceed for three hours at 120° C.–140° C. The volatile-free reaction product contained 17.5% polymerized acrylonitrile, as homopolymer and as combined with polyethyene in graft copolymer.

Extraction revealed that this product contained 65.0% ethylene homopolymer, 13.1% acrylonitrile homopolymer and 21.9% graft copolymer. The graft copolymer contained 20 parts of polymerized acrylonitrile bound to 80 parts of polyethylene.

EXAMPLE 7

(A) One hundred thirty-five grams of polymethacrylonitrile, having an intrinsic viscosity of 1.2 in cyclohexanone at 25° C., 365 grams of polyethylene (M. W. =21,000) and 1500 ml. of cyclohexanone were mixed in a kneader at 145° C. After five hours of mixing the resulting clear solution was poured into 3000 ml. of cold methanol. The precipitate, so formed, was washed with methanol to remove cyclohexanone and milled on rolls at 115° C., to remove residual methanol. The final physical blend contained 27% polymethacrylonitrile and 73% polyethylene.

Hot pressed films of this blend, at a thickness of 15 mils, were hazy, blushed when creased, displayed poor tear resistance, and could not be cold drawn. Furthermore, all (100%) of the polymethacrylonitrile in this physical blend could be extracted from the polyethylene with acetone. The extraction was effected by dispersing 20 grams of the blend in 300 ml. of hot benzene. After continued stirring and heating all of the polyethylene dissolved and the mass was poured into 1200 ml. of acetone to precipitate the polyethylene and dissolve the polymethacrylonitrile. The polyethylene fraction obtained after three successive extractions with benzene and acetone contained no (0.0%) polymethacrylonitrile.

(B) To a hot solution of 300 grams of polyethylene (M. W.=21,000) in 2500 grams of cyclohexane, 200.0 grams of monomeric methacrylonitrile were slowly added with agitation of the solution. Then, 2.0 grams of benzoyl peroxide were added in 450 grams of cyclohexane to catalyze the reaction. Reaction was allowed to proceed with agitation in a nitrogen atmosphere. An additional 2.0 grams of benzoyl peroxide in 80 grams of cyclohexane were added six hours after the reaction had begun. Total reaction time (at 75° C.–77° C.) was 22 hours. The reaction product was air-dried for 2.4 hours and was subsequently milled on rolls at 115° C. to remove residual solvent and unreacted monomer. Kjeldahl nitrogen analyses showed that this product contained 27.0% polymerized methacylonitrile.

This product gave hot pressed 15 mil films which did not blush when creased, had good tear resistance, and could be cold drawn. In addition, these films were more transparent and stiffer than a comparable film of the original polyethylene. Extraction of this product with acetone as described above (Example 7 (A)) revealed that 9% of the polymerized methacrylonitrile present could not be separated from the polyethylene.

(C) Three hundred grams of polyethylene (M. W. =21,000) and 100.0 grams of methacrylonitrile were reacted as above (Example 7 (B)) using two 1.0 gram additions of benzoyl peroxide as catalyst. The final product contained 11.6% polymerized methacrylonitrile. Hot pressed 15 mil films of this reaction product were highly transparent and stiffer than a film of the original polyethylene. The acetone extraction showed that 10% of the polymerized methacrylonitrile present could not be separated from the polyethylene.

Prolonged exposure of the nitrile grafted polyethylene polymers to heat and/or light may cause some darkening in color. Such color effects can be inhibited by adding to the nitrile grafted polyethylene polymers as such, or in admixture with ethylene homopolymer and nitrile homopolymer, small amounts, from about 0.1% to 2% by weight, of acidic substances such as phosphoric acid, di-octyl phosphate, tributyl phosphate, para toluene sulphonic acid, di-octyl tin maleate, monochloro fumaric acid, tetrachlorophthalic anhydride, phosphorous pentoxide, phthalimide, dodecyl mercaptan and triphenyl methane. In general, the highly acidic substances such as phosphoric acid, tetrachlorophthalic anhydride and para toluene sulphonic acid are better stabilizers than the weakly acidic materials such as triphenyl methane, phthalimide and tributyl phosphate.

Of the acidic stabilizers thus far examined, tetrachlorophthalic anhydride, and preferably at about 1% concentrations has yielded optimum stabilization against color degradation under compression molding temperatures, e. g. 275° F.–300° F. For example, a graft acrylonitrile-polyethylene composition such as is described in Example 4 (A) develops a dark brown color when compression molded at 275° F., whereas the same composition containing 1% by weight of tetrachlorophthalic anhydride exhibits only a light cream color even when molded at a higher temperature, namely 300° F.

What is claimed is:

1. A homogeneous thermoplastic composition consisting of ethylene homopolymer, a homopolymer of a polymerizable nitrile monomer having the formula

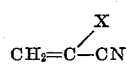

wherein X is a member selected from the group consisting of halogen, hydrogen, cyano, and methyl and a graft copolymer of the ingredients consisting of said nitrile monomer and polyethylene.

2. A homogeneous thermoplastic composition consisting of ethylene homopolymer, acrylonitrile homopolymer, and a graft copolymer of the ingredients consisting of acrylonitrile and polyethylene.

3. A homogeneous thermoplastic composition consisting of ethylene homopolymer, methacrylonitrile homopolymer and a graft copolymer of the ingredients consisting of methacrylonitrile and polyethylene.

4. A homogeneous thermoplastic composition consisting of between 34%–84% by weight ethylene homopolymer, between 2% and 43% by weight acrylonitrile homopolymer and between 13% and 34% by weight of a graft copolymer of the ingredients consisting of acrylonitrile and polyethylene.

5. A thermoplastic graft copolymer of the ingredients consisting of polyethylene and a polymerizable nitrile having the formula

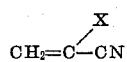

wherein X is a member selected from the group consisting of halogen, hydrogen, cyano and methyl.

6. Process for producing a thermoplastic graft copolymer which comprises reacting materials consisting of a polymerizable nitrile monomer having the formula

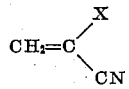

wherein X is a member selected from the group consisting of halogen, hydrogen, cyano and methyl in admixture with polyethylene and in the presence of a free radical producing polymerization catalyst.

7. Process for producing a thermoplastic graft copolymer which comprises reacting materials consisting of a polymerizable nitrile having the formula

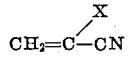

wherein X is a member selected from the group consisting of halogen, hydrogen, cyano and methyl in admixture with polyethylene dissolved in a volatile substantially non-reactive solvent therefor and in the presence of a free radical producing catalyst.

8. Process for producing a thermoplastic graft copolymer which comprises reacting materials consisting of acrylonitrile in admixture with polyethylene dissolved in a substantially non-reactive solvent and in the presence of a free radical producing catalyst.

9. Process for producing a thermoplastic graft copolymer which comprises reacting a mixture consisting of methacrylonitrile and a polyethylene dissolved in a substantially non-reactive solvent in the presence of a peroxide catalyst.

10. Process for producing a thermoplastic copolymer which comprises reacting in the presence of a free radical producing catalyst materials consisting of a polymerizable nitrile monomer having the formula

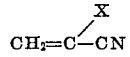

wherein X is a member selected from the group consisting of halogen, hydrogen, cyano and methyl in admixture with polyethylene dissolved in a substantially non-reactive solvent to form a homogeneous mixture comprising ethylene homopolymer, nitrile homopolymer, and graft copolymer of the nitrile and polyethylene.

11. Process for producing a thermoplastic graft copolymer which comprises reacting in the presence of a free radical producing catalyst materials consisting of a polymerizable nitrile monomer having the formula

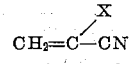

wherein X is a member selected from the group consisting of halogen, hydrogen, cyano and methyl in admixture with polyethylene dissolved in a substantially non-reactive solvent to form a homogeneous mixture comprising ethylene homopolymer, nitrile homopolymer and graft copolymer of the nitrile and polyethylene, and then separating the nitrile homopolymer from the mixture by extraction with a solvent therefor in which the graft copolymer is insoluble.

12. Process for producing a benzene-insoluble thermoplastic graft copolymer which comprises reacting materials consisting of acrylonitrile in admixture with polyethylene dissolved in a substantially non-reactive solvent and in the presence of a free radical producing polymerization catalyst to form a homogeneous mixture of ethylene homopolymer, acrylonitrile homopolymer and a graft copolymer of acrylonitrile and polyethylene, separating the ethylene homopolymer from the mixture by extraction with benzene, and then separating the acrylonitrile homopolymer from the mixture by extraction with dimethyl formamide.

References Cited in the file of this patent

UNITED STATES PATENTS 2,405,817    D'Alelio    Aug. 13, 1946
2,620,324    Coover et al.    Dec. 2, 1952

OTHER REFERENCES

Journal of Polymer Sciene, volume VIII, pages 257–277, particularly page 260 (1952).